United States Patent [19]

Rast, Jr.

[11] 4,176,919
[45] Dec. 4, 1979

[54] PASSIVE HIGH-SPEED AUTOMATIC SHUTTER FOR IMAGING DEVICES

[75] Inventor: Howard E. Rast, Jr., Solana Beach, Calif.

[73] Assignee: The United States of America as represented by the Secretary of the Navy, Washington, D.C.

[21] Appl. No.: 874,093

[22] Filed: Jan. 31, 1978

[51] Int. Cl.$^2$ ............................................. G02F 1/00
[52] U.S. Cl. .................................................... 350/354
[58] Field of Search .................. 350/354, 96.24, 96.25, 350/96.32; 331/94.5 M, 94.5 ML, 94.5 N, 94.5 Q

[56] References Cited

U.S. PATENT DOCUMENTS

| | | | |
|---|---|---|---|
| 3,152,215 | 10/1964 | Barstow et al. | 350/354 |
| 3,370,902 | 2/1968 | Allinikov | 350/354 |
| 3,506,333 | 4/1970 | Land | 350/354 |
| 3,507,552 | 4/1970 | Scott | 350/354 |

Primary Examiner—William L. Sikes
Attorney, Agent, or Firm—R. S. Sciascia; G. J. Rubens

[57] ABSTRACT

A passive, high-speed, automatic shutter for controlling the transmission of light energy of known wavelengths along a predetermined optical axis is provided to protect imaging devices against sudden, undesirable optical overload which may cause damage. A large plurality of contiguously positioned micro-channel optical waveguides is axially aligned parallel with the optical axis to intercept the light energy. The large plurality of micro-channel optical waveguides provides desirable maximization of resolution for transmitting the image to the imaging device. The micro-channel optical waveguides include a saturable absorber material which is selected for its property of absorbing the known wavelengths of light energy up to a determinable level of intensity and transmitting the known wavelengths of light energy when that determinable level of intensity is exceeded. When the determinable level of intensity is not exceeded, optical images are transmitted through the large plurality of micro-channel waveguides to the imaging device which may desirably be positioned in an off-axis, angular disposition. However, when the determinable level of intensity of the known wavelengths of light energy is exceeded, the large plurality of micro-channel optical waveguides including the saturable absorber material becomes effectively transparent and transmits all such light energy along its initial optical axis so that the excess level of intensity of light energy does not reach the off-axis imaging device.

11 Claims, 4 Drawing Figures

PASSIVE HIGH-SPEED AUTOMATIC SHUTTER FOR IMAGING DEVICES

BACKGROUND OF THE INVENTION

In its essential elements, a photodetector may be defined as an instrument which detects radiation by absorbing photons and generating an observable or detectable electric current or electronic charge. These devices can be classified generally as either photoconductive or photoemissive. In the latter, photons are absorbed in an appropriate photoelectric material which emits electrons into a vacuum. When accelerated under a potential or electric field, such emitted electrons are collected on an anode and the current or electric charge may be measured. More sophisticated devices may employ the photoemitted electrons to eject yet more electrons by causing them to collide with another electron emissive material thereby generating a higher current and achieving a gain in the total number of emitted electrons.

The photoconductive device, however, functions on a different principle in that a photoconductive material is laminated between a conducting semitransparent electrode and another electrode. When an electric field is applied across the electrodes and the laminate absorbs photons, carriers are generated leading to a change of the resistance of the device. The current is then measured using an appropriate circuit.

Each of the described techniques forms the basis for imaging devices. The photoemissive type of device may be easily damaged by excessive intensity of light energy. Conventionally, such devices may be constructed so as to include a mechanical iris or stop which may be either automatically or manually adjusted to obtain acceptable exposure levels. The iris employed for this purpose is basically similar to those which are widely used in photographic cameras, for example.

These types of imaging tubes and imaging devices are extensively employed in military systems for reconnaissance, surveillance, intrusion detection, and other imaging functions designed to detect extremely small differences in levels of radiant light energy in predetermined spectral bands. The exposure of such imaging devices to sudden high intensity levels of irradiance can severely damage the photocathode surfaces or saturate the system to a point rendering it totally or temporarily useless. The danger of such damage is most likely when a sudden occurrence of such excessive illumination takes place faster than the mechanical response time of the automatic iris. Bright flash lamps, flares, pulsed lasers, and nuclear explosions are among some of the sources of such highly undesirable sudden, excessive illumination.

Accordingly, there is a need for an automatic shutter which is high-speed in operation so as to overcome the deficiency of slowness of operation of the mechanical type iris or shutter which customarily may take several milliseconds to operate from its fully opened to its fully closed condition.

SUMMARY OF THE INVENTION

The present invention advantageously employs the property of certain materials known as saturable absorbers. Such saturable absorber materials become transparent when light energy of known wavelengths in sufficient intensity is incident upon the material.

One explanation of this phenomenon is that a saturable absorber material consists of N molecules in a given volume V, and when light of a predetermined wavelength is incident on the volume V, photons will be absorbed causing an electronic transition to an excited state. The material continues to absorb photons until the ground state is depleted of electrons. If then the return of electrons to the ground state is slow, it is possible for the incident light flux, if sufficiently intense, to excite all the molecules N to excited states. Accordingly, no molecules are then available to absorb additional light at that frequency and the material becomes transparent to light energy of that frequency. This phenomenon is well known to exist in numerous fluorescent dye materials, for example, as well as other types of fluorescent materials.

The present invention contemplates a passive, high-speed, automatic shutter for controlling the transmission of light energy of known wavelengths along a predetermined optical axis. A plurality of contiguously positioned micro-channel optical waveguides are axially aligned parallel with the optical axis so as to intercept the light energy of known wavelengths. A greater number of bundled micro-channel optical waveguides provides commensurately better resolution in transmitting an image contained in such light energy of known wavelengths, because each micro-channel optical waveguide constitutes a discrete resolution element.

The micro-channel optical waveguides include a saturable absorber material which is selected for its property of absorbing the known wavelengths of light energy up to a determinable level of intensity and transmitting the known wavelengths of light energy when that determinable level of intensity is exceeded.

The micro-channel optical waveguides may take different forms. For example, in one contemplation of the concept of the present invention, the saturable absorber material is contained within filaments of polymerized material which is transparent to the known wavelengths of light energy. Such micro-channel optical waveguides are, in effect, very small dimensioned light paths of rod-like configuration bundled together so that each filament is a micro-channel optical waveguide transmitting the known wavelengths of light energy therethrough by substantially total internal reflection.

Such images as are contained in the light energy of known wavelengths incident upon the bundled plurality of contiguously positioned micro-channel optical waveguides are absorbed by the saturable absorber material, which fluoresces, so as to form a light image at the other end of the bundle of the plurality of the contiguously positioned micro-channel optical waveguides. If the composite of such great plurality of contiguously positioned micro-channel optical waveguides has an output surface or end plate angularly disposed to the optical axis at which the light energy is initially received, an image will be presented at the ends of the plurality of contiguously positioned micro-channel optical waveguide which can be detected by an off-axis photodetector imaging means. This image formation is presented at the angular off-set, as well as along the optical axis, due to the property of fluorescent materials to emit into a $4\pi$ steradians angle.

When, however, the level of intensity of the known wavelengths of light energy exceeds the saturation level of the saturable absorber material, the plurality of contiguously positioned micro-channel optical waveguides effectively become transparent to such excess light energy, since they are incapable of absorbing additional light energy; therefore, such excess light energy of the known wavelengths is transmitted along its original optical axis and is not incident upon, nor received by, the off-axis photoresponsive imaging device. Since the excess light energy does not reach the imaging device under these conditions, the shutter may be considered to be "closed". Accordingly, the imaging device is protected against sudden high intensity levels of light energy which may otherwise undesirably render the imaging device temporarily inoperative or cause permanent damage.

A variant embodiment of the present invention contemplates a plurality of contiguously positioned micro-channel capillary tubes retained within an enclosure between two end plates. The micro-channel capillary tubes may be of the order of one hundred microns outside diameter fabricated of suitable high grade glass or similar material and filled with a solvent in which the saturable absorber material has been dissolved. Such saturable absorber material may comprise a selected one of a number of dye materials which are known to exhibit the saturable absorber property and phenomenon. In the described variant preferred embodiment of the present invention, each such micro-channel capillary waveguide transmits the light energy of known wavelengths along an axis aligned with the predetermined optical axis at which the light energy is received and provides an image at an angular output plane having a degree of resolution commensurate with the number of such micro-channel capillary waveguides employed in a bundled manner within the enclosure between the end plates of the assembly.

In a manner similar to that previously described in connection with the solid material embodiment of the present invention, the latter variant preferred embodiment employing liquid solvent having a saturable absorber material dissolved therein, functions to absorb the light energy of determinable wavelengths up to a determinable level of intensity providing an image for detection by suitable photoresponsive image detecting device, preferably positioned off-axis with respect to the optical axis at which the light energy of known wavelengths was initially received.

When the determinable level of intensity is exceeded, the saturable absorber material dissolved in the solvent contained within the walls of the plurality of the contiguously positioned micro-channel capillary waveguides effectively becomes transparent since it is incapable of absorbing the excess light energy and accordingly such light energy is transmitted along its initial optical axis without being incident upon or received by the imaging device. In this condition the shutter may be considered to be "closed" since the excess light energy does not reach the imaging device. Accordingly, the imaging device is protected from being rendered temporarily inoperative or being permanently damaged.

Advantageously, the present invention provides an automatic shutter which is passive in its operation, i.e., does not require outside control and, moreover, is significantly faster in its operation than mechanical or comparable shutters. The saturation takes place in less than one microsecond and, most desirably, the automatic high-speed passive shutter of the present invention provides extremely rapid recovery from its saturated condition so that its cyclic speed of operation is significantly faster than that possible with prior art mechanical type shutters.

Accordingly, it is a primary object of the present invention to provide an improved automatic shutter for the protection of imaging devices from excessive damaging irradiation.

A further most important object of the present invention is to provide a passively operative, automatic shutter which will afford significantly improved high-speed operation.

Yet another most important object of the present invention is to provide such an automatic, passive, high-speed shutter for protection of imaging devices which is compact, inexpensive, and readily adaptable to use in conventional imaging systems.

Another object of the present invention is to provide such an automatic passive shutter for the protection of imaging devices which operates to produce a high optical isolation in a "closed" mode of operation.

A further object of the present invention is to provide such an automatic passive shutter for the protection of imaging devices which has the property of low light loss in its transmissive mode.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
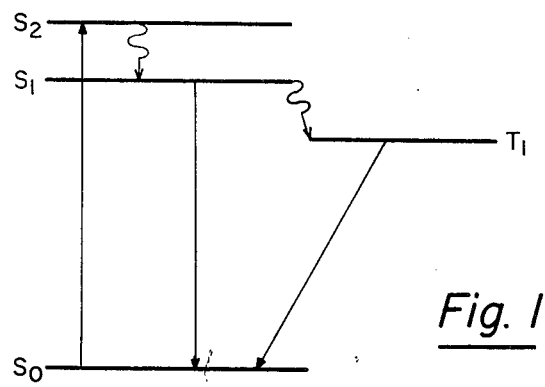
FIG. 1 is an energy level diagram typical of the type of saturable absorber which may be employed in the present invention.

The concept of the present invention resides in the novel and advantageous use of the optical properties of saturable absorber materials. FIG. 1 is an energy level diagram of a typical such saturable absorber which in the past, has been employed in Q-switched or mode-locked lasers.

When such a saturable absorber material is in its unexcited condition, it is said to be in its "ground" electronic state $S_0$. In the "ground" electronic state none of the electronic states $S_1$, $S_2$, or $T_1$ nor higher states, are occupied. However, upon absorption of a photon matching the energy difference $E(S_2)-E(S_0)$, an electron is excited to the level $S_2$ where several subsequent transitions are possible.

The electron may relax back to the ground state $S_0$, emitting a photon corresponding to the energy difference $E(S_2)-E(S_0)$; alternatively, the electron may undergo radiationless relaxation to a lower level $S_1$ with subsequent emission of a photon with the energy $E(S_1)-E(S_0)$; or a third possibility is that the electron may relax to a lower triplet level $T_1$ which later emits a photon with the energy $E(T_1)-E(S_0)$. These three possibilities are illustrated graphically in an energy level diagram of FIG. 1.

There are additional electronic transitions which are possible other than those illustrated and explained from the diagram of FIG. 1 but they are not necessarily relevant to an understanding of the operable phenomenon of saturable absorbers as employed within the concept of the present invention.

With respect to the quantitative aspect of energy levels such as those illustrated in FIG. 1 with ordinary sources of illuminance, the number of excited electrons is very small compared to those remaining in the ground state, $S_0$. For purposes of illustration, an example may be considered where a saturable absorber dye solution has a concentration of 0.10 molar which means that there are approximately $10^{19}$ molecules per cubic centimeter. If such a dye solution is illuminated with a source of light having a steady state flux of $10^{15}$ photons/sec. cm.$^2$, only one ten-thousandth of the excited states will be occupied at any given time, and photons will continue to be absorbed as they impinge upon the saturable absorber material.

If on the other hand, the solution is suddenly illuminated with a source of light having an equivalent photon flux exceeding the concentration of saturable absorber molecules and faster than the relaxation processes back into ground state, the saturable absorber material will be "bleached" and will in effect be momentarily transparent to the excess of such photons. There are many such saturable absorber materials known in the form of liquid dyes and other materials, two general categories of which are crypto-cyanine and hologenerated naphthalenes.

Figure 2:
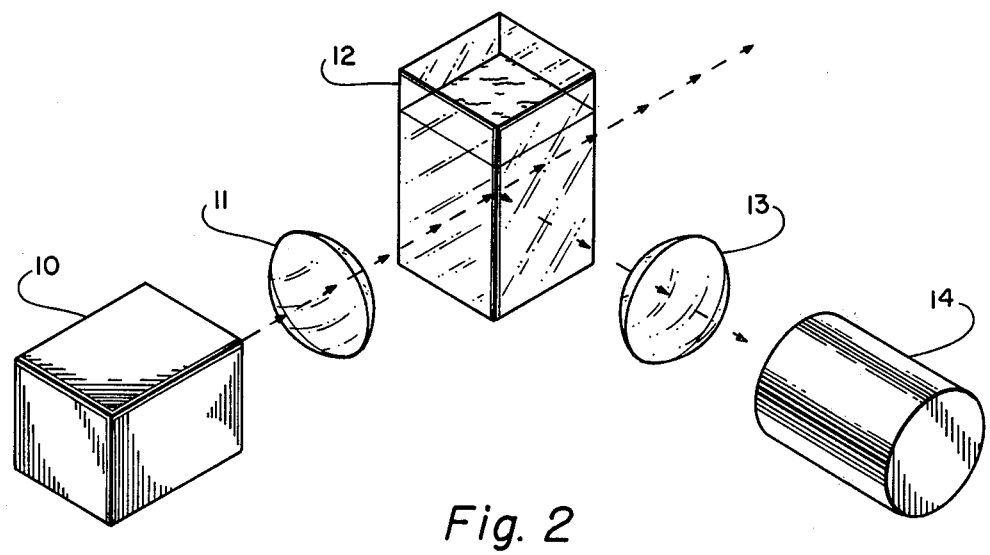
FIG. 2 is a schematic diagram illustrating the phenomenon of off-axis fluorescence of operative saturable absorber materials.

The preceding explanation and discussion should be helpful in understanding the operational phenomenon characteristic of saturable absorbers with a view to the understanding of how such operational phenomenon are advantageously employed within the concept of the present invention. FIG. 2 is a schematic diagram illustrating how a saturable absorber material may be illuminated and monitored at right angles to the optical axis of the illumination for detecting the fluorescense of the saturable absorber material.

In FIG. 2 a source of light energy 10 emits along the optical axis as indicated by the dash lines and the arrows. An optical element in the form of a lens 11, focuses the light energy on a saturable absorber material contained within element 12.

At ordinarily low illuminance, the saturable absorber material element 12 will fluoresce emitting diffuse light energy through the optical element 13 for reception by a light responsive detector 14. Under such conditions the saturable absorber material will fluoresce in a manner which is generally proportional to the photon flux of the incoming excitation radiation.

However, if the light energy source 10 reaches an intensity which exceeds a known and determinable threshold depending upon the concentration and excited state lifetime of the saturable absorber material, the medium will "bleach" or become transparent thereby passing the excess photons.

Accordingly, the detector 14 will not observe a light energy signal greater than $\phi GN$ where $\phi$ is the quantum yield of fluorescence, G is a geometrical factor expressing the efficiency of the detector optics, and N is the concentration of the saturable absorber material. Because $\phi \leq 1.0$, and $g < 1$, N establishes the upper limits of luminescence flux observed by the detector 14.

Those skilled and knowledgeable in the pertinent arts will appreciate that the operational phenomenon of saturable absorber material as illustrated in FIG. 2 will fluoresce in a generally diffuse pattern at right angles in the direction of the detector 14 in the form of light energy having very little or no image resolution.

Figure 3:
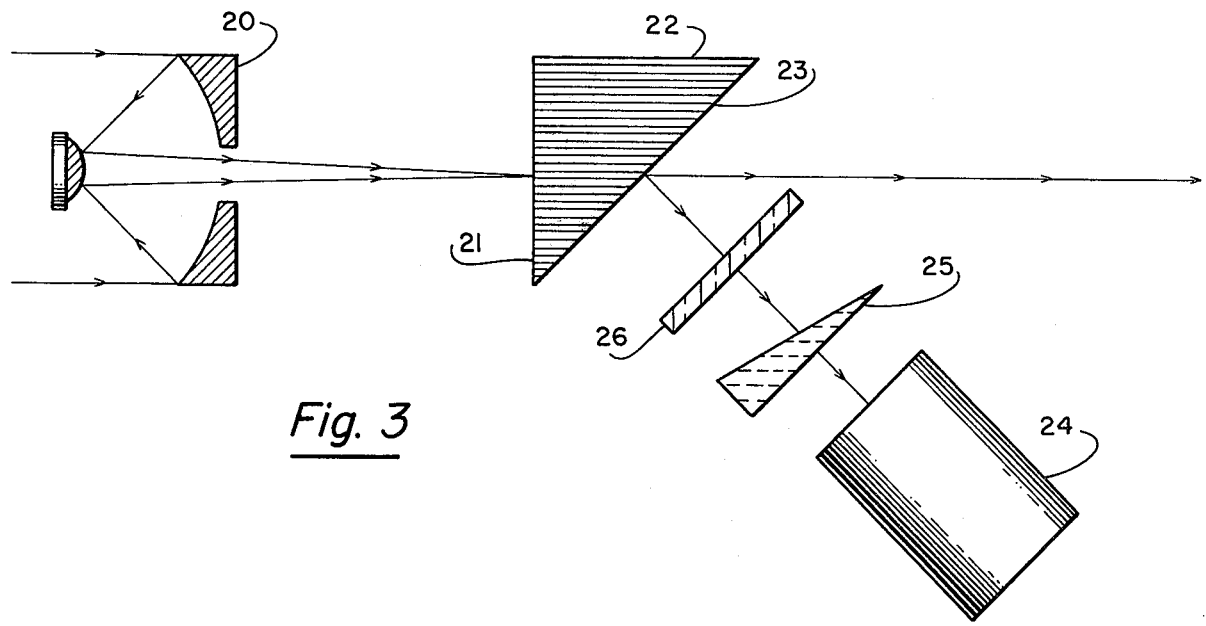
FIG. 3 is an illustration of an embodiment of the present invention as employed to protect an imaging device.

FIG. 3 illustrates how the concept of the present invention provides a unique configuration of an element employing saturable absorber material so as to produce a light energy image having good resolution which may be detected at a photoresponsive imaging device positioned off-center from the principal optical axis along which the light energy image is initially received.

In FIG. 3, suitable collection optics 20 receive the light energy image which is focused upon one face 21 of the passive, high-speed, automatic shutter of the present invention 22 which controls the transmission of light energy of known wavelengths along the optical axis indicated generally by the aligned arrows indicative of light energy transmitting from left to right. As is customary in schematic diagrams involving optics, the rays of light energy as shown entering the collecting optics 20 and emitting therefrom are intended to indicate only one central point axially located on the image, and not the entire image.

The passive, high-speed, automatic shutter 22 of the present invention comprises a plurality of separate but contiguously positioned micro-channel optical waveguides which are bundled together and axially aligned parallel with the optical axis along which the known wavelength of light energy is propagated, and positioned to intercept the light energy to control its transmission.

The plurality of contiguously positioned micro-channel optical waveguides in the passive, high-speed, automatic shutter 22 include a saturable absorber material which is selected for its property of absorbing the known wavelengths of light energy up to a determinable level of intensity and for transmitting those known wavelengths of light energy when that determinable level of intensity is exceeded. The plurality of a great many contiguously positioned micro-channel optical waveguides which are bundled together and aligned and positioned as described previously may be comprised of a large plurality of micro-channel capillary glass tubes filled with a fluid comprised of a saturable absorber material selected for its characteristics as taught by the concept of the present invention and dissolved in a suitable solvent which is (1) transparent to the known wavelengths of light energy for which the system is designed; (2) and does not chemically react with the saturable absorber material, and; (3) does not quench the fluorescence of the saturable absorber material.

Examples of such materials are
   3,3'-diethylthia tricarbocyanine (DTTC)
   3,3'-diethyloxa dicarbocyanine iodide (DODCI)
   Rhodamine 6G
   dimethyl 1,4-di[2-(5-phenoxayolyl]-benzene Examples of suitable solvents are benzene, ethanol, acetone, or other organic solvents which meet the criteria listed hereinbefore.

The micro-channel capillary glass tubes which are used in the passive, high-speed, automatic shutter 22 of the present invention have a maximum outside diameter of the order of one hundred microns and when filled with a solution including a selected saturable absorber material as taught by the present invention, each of such glass capillaries functions in the manner of an individual, discrete micro-channel optical waveguide. In the embodiment of the present invention which employs a liquid solution, end plates 21 and 22 are preferably employed to retain the solution therebetween within the large number of contiguously positioned glass tubes. As is illustrated in FIG. 3, the second face plate 23 is disposed at an off-axis angle relative to the principle optical axis at which the light energy of known wavelengths is initially received.

A light energy image received at face plate 21 will be transmitted by the plurality of contiguously positioned micro-channel optical waveguides with photon flux being absorbed discretely by each such micro-channel optical waveguide in accordance with its spatial disposition relative to spatial image element intensity. Such absorption, when not exceeding the known threshold of the saturable absorber material, will excite fluorescence which in general is isotropic and emitted in all directions. However, each micro-channel optical waveguide functions to preserve the resolution of a given image point which it represents. Accordingly, each micro-channel optical waveguide carries its own image information without substantial degradation or diffused interaction and such information is transmitted to face plate 23 where the light energy image may be detected by an optical imaging device 24.

Because the second face plate 23 is disposed at an angle, it is desirable to correct the transformed image back to the flat field existing at face 21. This can readily be accomplished, for example, by interposing a correction prism 25 between the second face 23 and the optical imaging device 24. Additionally, a suitable filter 26 may be interposed between the second face plate 23 and the optical imaging device 24 to pass only fluorescence frequencies.

Accordingly, because of the extremely small dimensions of the great plurality of contiguously positioned micro-channel optical waveguides employed within the concept of the present invention, an image will be transmitted by fluorescence caused by the relative absorption of light energy within each micro-channel optical waveguide. The aggregate fluorescence emitted by the great plurality of contiguously positioned micro-channel optical waveguides, provides a degree of resolution and detail as a function of the minute cross-sectional dimensions of each micro-channel optical waveguide and the number of micro-channel optical waveguides.

The protective aspect of the passive, high-speed, automatic shutter of the present invention functions in the following manner: when a sudden pulse of high intensity light energy is received along the optical axis and transmitted by the collection optics 20, the saturable absorber material contained within the plurality of the contiguously positioned micro-channel optical waveguides will become "bleached" and effectively transformed to a transparent medium allowing the excess photon flux to pass through in alignment with the main optical axis of the system. Thus, each individual micro-channel optical waveguide functions to constrain the excess radiation to directions which are parallel to the main optical system and the excess photon flux is passed straight through so that it is not received by the optical imaging device 24. Therefore, the automatic shutter functions so that the optical imaging device 24 cannot be damaged by the excess photon flux and when the excess light energy is passed straight through the present invention may be considered to be in its "closed" shutter condition.

In a variant embodiment of the present invention, the plurality of contiguously positioned micro-channel optical waveguides which comprise the passive, high-speed, automatic shutter 22 may consist of filaments of polymerized material which is transparent to the known wavelengths of light energy it is desired to act upon, and contains a saturable absorber material that is selected for its property of absorbing the known wavelengths of light energy up to a determinable intensity, and transmitting the known wavelengths of light energy when the determinable level of intensity is exceeded.

Such plurality of aligned contiguous filaments may be fabricated by dissolving a selected saturable absorber material in a material which is readily polymerized and transparent to the known wavelengths of light energy. Then, the material is drawn into very small dimensioned filaments. (These techniques fabricating and drawing extremely small diameter filaments are well known in the fiber optic art and are commonly used to provide multifilament face plates for specialized applications where it is desired to transmit light energy emitted from the face plate of a cathode ray tube).

The saturable absorber filaments are preferably coated or clad with a material which will insure substantial internal reflection along each such filament; they then may be secured or bonded together in a bundled form through the use of techniques which are comparable to those employed in the fiber optic arts.

Figure 4:
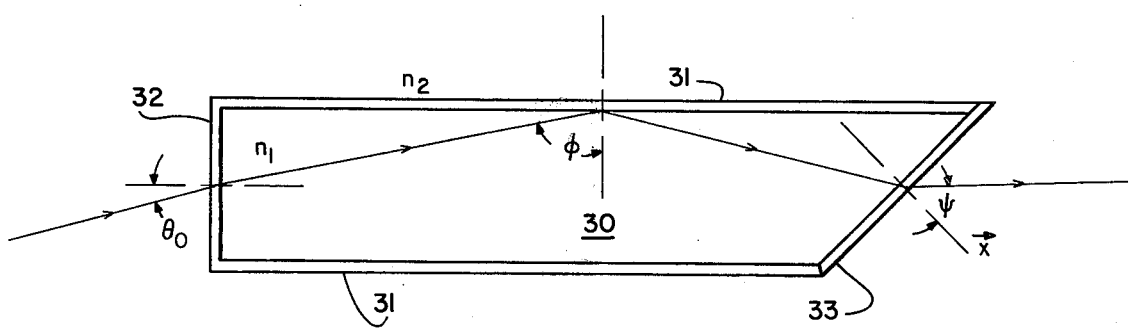
FIG. 4 is an illustration of a single one of the plurality micro-channel waveguides as conceived and employed in the practice of the present invention.

FIG. 4 is an illustration of one micro-channel optical waveguide greatly enlarged for purposes of illustration and understanding. In FIG. 4 the micro-channel optical waveguide 30, shown in crosssection, includes circumferential internally reflecting material 31, which may be either glass in the case where a fluid saturable absorber material dissolved in a solvent is employed or, alternatively, a suitable coating to insure internal reflection where the transmitting material of the micro-channel optical waveguide 30 is comprised of a polymerized material containing a saturable absorber material. The end plates 32 and 33 are disposed at substantially the same angle relative to each other (i.e. 45 degrees) as was illustrated in the embodiment of FIG. 3. In either embodiment, the preferred fabrication technique would include the step of forming the desired end angles after the plurality of micro-channel optical waveguides have been bundled.

In FIG. 4, incident light energy is shown entering the micro-channel optical waveguide at an angle of $\theta_0$ and after undergoing transmission along the micro-channel optical waveguide by internal reflection will, because of absorption below the threshold level of the saturable absorber, be emitted in the form of fluorescence at an angle $\psi$ from the end plate 33. Accordingly, $$\sin \theta_0 = (n_1^2 - n_2^2)^{\frac{1}{2}} \text{ for } n_2 < n_1$$

$$\psi = \phi - \pi/4, \text{ where } \phi = \sin^{-1}(n_2/n_1)$$

The component in the direction $\vec{X}$ is $$\cos \psi = \frac{\sqrt{2}}{2n_1}\left(n_2 + \sqrt{n_1^2 - n_2^2}\right)$$

The acceptance angle $\theta_0$ can be limited by suitable baffles, stops, and a bandpass filter, thereby reducing undesirable radiation in the $\vec{X}$ direction. Because fluorescence is emitted over $4\pi$ steradians, however, the emission on the end plate 33 would appear as a uniform lambertian source.

The conversion factor is approximately $$g \frac{\epsilon \alpha^2}{8\pi},$$

where g is a geometrical factor, $\epsilon$ is quantum yield of fluorescence, and $\alpha$ is the numerical aperture of the micro-channel.

Those skilled and knowledgeable in the pertinent arts will readily appreciate the advantages of such operation of the passive, high-speed, automatic shutter of the present invention in its function of protecting optical imaging devices from saturation and/or possible temporary or permanent damage.

Moreover, the present invention has highly desired advantages as compared to other types of shutters or protective devices employed for comparable functions. These have been tabulated below for purposes of ready comparison.

TABLE 1

| Characteristic | PLZT | Mechanical shutter | Photochromic | Bleachable luminescent material |
|---|---|---|---|---|
| Response time | 50 $\mu$ sec | 10 m sec | $10^{-4}$ to 10 sec | $<100 \times 10^{-9}$ sec |
| Max OD | 4 | $\infty$ | 2–5 | $\infty$ |
| Insertion loss dB | 7 | 0 | 0.5 to 1 | 15–25 |
| Estimated cost/tube $K | 1.0 | 0.2 | 0.05 | 0.3 |
| Range, $\lambda$ $\mu$ | 0.3 to 1.5 | $0 \longleftrightarrow \infty$ | 0.3 to 1.5 | 0.3 to 1.2 |
| Temperature range | $-10°$ to $+55°$ C. | Large | Highly temp. dependent | $-10°$ to $+80°$ C. |
| Major disadvantages | Requires x-polaroids High voltage electrodes can be damaged | Slow | Degrades w/ time Slow recovery | High Insertion loss |
| Major advantages | Fast | Reliable Inexpensive High max. OD Low loss | Inexpensive Low loss | Unlimited OD Very fast |

From this tabulation, it may be readily seen that on balance, the advantages of the present invention weigh heavily in its favor as compared to its disadvantages and provide significant improvement over the known prior art devices performing comparable functions.

Accordingly, the present invention provides many advantages, including simplicity, relatively low cost, very fast response time, and high equivalent optical densities.

The passive high-speed automatic shutter of the present invention is inexpensive because of the large number of saturable absorber dyes and luminescence materials which are available for use in its practice. Moreover, the reason that the passive, high-speed, automatic shutter of the present invention can provide much faster operative speeds than conventional mechanical or electrooptical shutters, resides in the fact that many dyes and fluorescent materials exhibit response times of less than one micro second.

Additionally, many different optical configurations which fold or condense the optical path as shown in the arrangement of FIG. 3 are possible in the employment of the present invention.

Obviously, many other modifications and variations of the present invention are possible in the light of the above teachings. It is therefore to be understood that within the scope of the appended claims the invention may be practiced otherwise than as specifically described.

What is claimed is:

1. A passive, high-speed, automatic shutter for controlling the transmission of light energy of known wavelengths along a predetermined optical axis comprising:

a plurality of contiguously positioned micro-channel optical waveguides axially aligned parallel with said optical axis to intercept said light energy;

a saturable absorber material contained in each of said micro-channel optical waveguides having the property to absorb said known wavelengths of light energy up to a determinable level of intensity, and the saturable absorber material further having the property to transmit said known wavelengths of light energy when said determinable level of intensity is exceeded.

2. A passive, high-speed, automatic shutter for controlling the transmission of light energy of known wavelengths along a predetermined optical axis comprising:

a plurality of contiguously positioned micro-channel optical waveguides axially aligned parallel with said optical axis to intercept said light energy;

said micro-channel optical waveguides comprising filaments of polymerized material transparent to said known wavelengths and containing a saturable absorber material having the property to absorb said known wavelengths of light energy up to a determinable level of intensity and the saturable absorber material further having the property to transmit said known wavelengths of light energy when said determinable level of intensity is exceeded.

3. A passive, high-speed, automatic shutter for controlling the transmission of light energy of known wavelengths along a predetermined optical axis comprising:

an enclosure having end plates of a material transparent to said known wavelengths and positioned to intercept said optical axis;

a plurality of contiguously positioned micro-channel capillary optical waveguides retained in said enclosure between said end plates and axially aligned parallel with said optical axis to intercept said light energy;

a solvent filling said micro-channel capillary optical waveguides, said solvent being transparent to said known wavelengths; and a selected saturable absorber material dissolved in said solvent, said saturable absorber material having the property to absorb said known wavelengths of light energy up to a determinable level of intensity and the saturable absorber material further having the property to transmit said known wavelengths of light energy when said determinable level of intensity is exceeded.

4. A passive, high-speed, automatic shutter as claimed in claim 3 wherein one of said end plates is orthogonally disposed relative to said optical axis and the other of said end plates is angularly disposed relative to said optical axis.

5. A passive, high-speed automatic shutter as claimed in claim 3 wherein said solvent has the property to chemically nonreact with said selected saturable absorber material.

6. A passive, high-speed automatic shutter as claimed in claim 3 wherein said solvent has the property to nonquench the fluorescence caused by the absorption of said known wavelengths.

7. A passive, high-speed automatic shutter as claimed in claim 3 wherein said saturable absorber material is a fluorescent dye.

8. A passive, high-speed automatic shutter as claimed in claim 7 wherein said fluorescent dye is 3,3'-diethylthia tricarbocyanine.

9. A passive, high-speed automatic shutter as claimed in claim 7 wherein said fluorescent dye is 3,3'-diethyloxadicarbocyanine iodide.

10. A passive, high-speed automatic shutter as claimed in claim 7 wherein said fluorescent dye is rhodamine 6G.

11. A passive, high-speed automatic shutter as claimed in claim 7 wherein said fluorescent dye is dimethyl 1,4-di[Z-(5 phenoxayolyl]-benzene.

* * * * *